United States Patent
Dai et al.

(10) Patent No.: US 11,309,539 B2
(45) Date of Patent: Apr. 19, 2022

(54) ELECTROCHEMICAL CELL AND METHOD OF MANUFACTURING

(71) Applicant: GM GLOBAL TECHNOLOGY OPERATIONS LLC, Detroit, MI (US)

(72) Inventors: Fang Dai, Troy, MI (US); Meinan He, Sterling Heights, MI (US); Shuru Chen, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/131,875

(22) Filed: Sep. 14, 2018

(65) Prior Publication Data

US 2019/0207211 A1    Jul. 4, 2019

Related U.S. Application Data

(63) Continuation-in-part of application No. 15/862,187, filed on Jan. 4, 2018, now Pat. No. 10,797,353.

(51) Int. Cl.
*H01M 4/36* (2006.01)
*H01M 10/05* (2010.01)
(Continued)

(52) U.S. Cl.
CPC ......... *H01M 4/366* (2013.01); *H01M 4/0404* (2013.01); *H01M 4/0421* (2013.01);
(Continued)

(58) Field of Classification Search
CPC ..... H01M 4/381; H01M 4/366; H01M 4/0404
See application file for complete search history.

(56) References Cited

U.S. PATENT DOCUMENTS

| | | |
|---|---|---|
| 4,162,202 A | 7/1979 | Dey |
| 4,508,608 A | 4/1985 | Palmer |

(Continued)

FOREIGN PATENT DOCUMENTS

| | | |
|---|---|---|
| CN | 102339982 A | 2/2012 |
| CN | 105154849 A | 12/2015 |

(Continued)

OTHER PUBLICATIONS

Liu, Y. et al.; Lithium-coated polymeric matrix as a minimum volume-change and dendrite-free lithium metal anode; nature Communications; DOI: 10.1038/ncomms10992; pp. 1-9.

(Continued)

*Primary Examiner* — Ula C Ruddock
*Assistant Examiner* — Frank A Chernow
(74) *Attorney, Agent, or Firm* — Harness, Dickey & Pierce, P.L.C.

(57) ABSTRACT

An electrochemical cell comprising an alkali metal negative electrode layer physically and chemically bonded to a surface of a negative electrode current collector via an intermediate metal chalcogenide layer. The intermediate metal chalcogenide layer may comprise a metal oxide, a metal sulfide, a metal selenide, or a combination thereof. The intermediate metal chalcogenide layer may be formed on the surface of the negative electrode current collector by exposing the surface to a chalcogen or a chalcogen donor compound. Then, the alkali metal negative electrode layer may be formed on the surface of the negative electrode current collector over the intermediate metal chalcogenide layer by contacting at least a portion of the metal chalcogenide layer with a source of sodium or potassium to form a layer of sodium or potassium on the surface of the negative electrode current collector over the metal chalcogenide layer.

20 Claims, 4 Drawing Sheets

(51) Int. Cl.
- *H01M 4/48* (2010.01)
- *H01M 4/58* (2010.01)
- *H01M 4/38* (2006.01)
- *H01M 4/1395* (2010.01)
- *H01M 4/04* (2006.01)
- *H01M 10/054* (2010.01)
- *H01M 4/134* (2010.01)
- *H01M 4/66* (2006.01)
- *H01M 4/74* (2006.01)
- *H01M 10/052* (2010.01)
- *H01M 4/80* (2006.01)

(52) U.S. Cl.
CPC ....... *H01M 4/0452* (2013.01); *H01M 4/0483* (2013.01); *H01M 4/134* (2013.01); *H01M 4/1395* (2013.01); *H01M 4/381* (2013.01); *H01M 4/382* (2013.01); *H01M 4/483* (2013.01); *H01M 4/5815* (2013.01); *H01M 4/661* (2013.01); *H01M 4/667* (2013.01); *H01M 4/742* (2013.01); *H01M 4/747* (2013.01); *H01M 4/808* (2013.01); *H01M 10/052* (2013.01); *H01M 10/054* (2013.01)

(56) References Cited

U.S. PATENT DOCUMENTS

| | | |
|---|---|---|
| 4,539,052 A | 9/1985 | Palmer et al. |
| 5,464,707 A | 11/1995 | Moulton et al. |
| 5,616,437 A | 4/1997 | Gao |
| 6,001,139 A | 12/1999 | Asanuma |
| 6,402,795 B1 | 6/2002 | Chu et al. |
| 10,797,301 B2 | 10/2020 | Dai et al. |
| 10,797,353 B2 | 10/2020 | Adair et al. |
| 2016/0118687 A1* | 4/2016 | Nakanishi ........... H01M 4/5825 429/200 |
| 2016/0240376 A1 | 8/2016 | Yeh et al. |
| 2017/0073809 A1 | 3/2017 | Choi et al. |
| 2017/0324113 A1 | 11/2017 | Mayer |
| 2017/0338522 A1 | 11/2017 | Hu et al. |
| 2019/0207211 A1 | 7/2019 | Dai et al. |

FOREIGN PATENT DOCUMENTS

| | | |
|---|---|---|
| CN | 106784600 A | 5/2017 |
| CN | 110010971 A | 7/2019 |
| DE | 69636385 T2 | 9/2007 |
| DE | 102018133726 A1 | 7/2019 |
| JP | H04126355 A | 4/1992 |
| JP | H0696775 A | 4/1994 |

OTHER PUBLICATIONS

First Office Action for Chinese Patent Application No. 201811524881.1 dated Sep. 13, 2021, with correspondence dated Sep. 15, 2021, from China Patent Agent (H.K.) Ltd summarizing contents; 12 pages.
First Office Action for German Patent Application No. 102018133726.4 dated Jul. 20, 2021; 5 pages.

* cited by examiner

ELECTROCHEMICAL CELL AND METHOD OF MANUFACTURING

CROSS-REFERENCE TO RELATED APPLICATION

This application is a continuation-in-part application of U.S. application Ser. No. 15/862,187 filed Jan. 4, 2018 and incorporated herein by reference in its entirety.

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary alkali metal ion batteries, including lithium (Li) ion batteries, sodium (Na) ion batteries, and potassium (K) ion batteries, generally comprise one or more electrochemical cells including a negative electrode, a positive electrode, a porous separator, an electrolyte, a negative current collector, and a positive current collector. Such batteries are powered by the cooperative movement of alkali metal ions (e.g., $Li^+$, $Na^+$, or $K^+$) and electrons between the negative and positive electrodes of each electrochemical cell. The electrolyte is ionically conductive and provides a medium for the conduction of the alkali metal ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Uniform and sustained physical contact between the negative and positive electrodes and their respective current collectors is necessary to ensure effective charge transport therebetween and efficient battery operation throughout the life of the battery.

SUMMARY

An electrochemical cell may comprise a positive electrode layer, an alkali metal negative electrode layer spaced apart from the positive electrode layer, and an electrolyte in ionic contact with the positive and negative electrode layers. The positive electrode layer may be electrically coupled to a positive electrode current collector. The alkali metal negative electrode layer may be electrically coupled to a negative electrode current collector. The alkali metal negative electrode layer may comprise a layer of sodium (Na) or potassium (K). The alkali metal negative electrode layer may be physically and chemically bonded to a surface of the negative electrode current collector via an intermediate metal chalcogenide layer.

The metal chalcogenide layer may comprise a metal oxide, a metal sulfide, a metal selenide, or a combination thereof.

The negative electrode current collector may comprises copper (Cu). In such case, the intermediate metal chalcogenide layer may comprise copper oxide, copper sulfide, copper selenide, or a combination thereof.

The negative electrode current collector may comprises a non-porous metal foil, a perforated metal sheet, a porous metal mesh, or a porous open-cell metal foam.

The negative electrode current collector may comprises a first surface and an opposite second surface. The first surface of the negative electrode current collector may be physically and chemically bonded to a first alkali metal negative electrode layer via a first intermediate metal chalcogenide layer, and the second surface of the negative electrode current collector may be physically and chemically bonded to a second alkali metal negative electrode layer via a second intermediate metal chalcogenide layer.

The negative electrode current collector may have a thickness in the range of 8-150 μm. The metal chalcogenide layer may have a thickness in the range of one nanometer to 10 micrometers. The alkali metal negative electrode layer may have a thickness in the range of one micrometer to 1000 micrometers.

The alkali metal negative electrode layer may comprises, by weight, greater than 97% sodium (Na) or greater than 97% potassium (K).

A secondary lithium metal battery may include a plurality of the electrochemical cells, and the electrochemical cells may be connected in a series or parallel arrangement.

In a method of manufacturing an electrochemical cell, a porous or non-porous metal substrate may be provided. A surface of the metal substrate may be exposed to a chalcogen or a chalcogen donor compound such that a conformal metal chalcogenide layer forms on the surface of the metal substrate. At least a portion of the metal chalcogenide layer on the surface of the metal substrate may be placed in contact with a source of sodium (Na) or potassium (K) to form a layer of sodium or potassium on the surface of the metal substrate over the metal chalcogenide layer.

The chalcogen may comprise oxygen, sulfur, selenium, or a combination thereof. In such case, the metal chalcogenide layer may comprise a metal oxide, a metal sulfide, a metal selenide, or a combination thereof.

The metal substrate may comprise copper. In such case, the metal chalcogenide layer may comprise copper oxide, copper sulfide, copper selenide, or a combination thereof.

In one form, the chalcogen may comprise oxygen. In such case, the conformal metal chalcogenide layer may be formed on the surface of the metal substrate by exposing the metal substrate to gaseous oxygen by heating the metal substrate in air such that the gaseous oxygen chemically reacts with and bonds to the surface of the metal substrate.

In another form, the chalcogen may comprise sulfur or selenium. In such case, the conformal metal chalcogenide layer may be formed on the surface of the metal substrate by exposing the metal substrate to gaseous sulfur or selenium by heating a volume of solid phase sulfur or selenium to release a volume of gaseous sulfur or selenium therefrom and exposing the surface of the metal substrate to the volume of gaseous sulfur or selenium such that the gaseous sulfur or selenium chemically reacts with and bonds to the surface of the metal substrate.

In another form, the conformal metal chalcogenide layer may be formed on the surface of the metal substrate by applying a chalcogenide precursor solution to the surface of the metal substrate. In such case, the chalcogenide precursor solution may comprise a chalcogen-donor compound dissolved in a solvent. The chalcogen-donor compound may comprise at least one of an oxygen donor compound, a sulfur donor compound, or a selenium donor compound.

In one form, the layer of sodium or potassium may be formed on the surface of the metal substrate over the metal chalcogenide layer by immersing at least a portion of the metal substrate in a volume of molten sodium or potassium such that the molten sodium or potassium chemically reacts with and actively wets the metal chalcogenide layer on the surface of the metal substrate.

In another form, the layer of sodium or potassium may be formed on the surface of the metal substrate over the metal chalcogenide layer by heating a volume of molten sodium or potassium in a subatmospheric pressure environment to release a volume of gaseous sodium or potassium therefrom and exposing the metal chalcogenide layer on the surface of the metal substrate to the volume of gaseous sodium or potassium such that the gaseous sodium or potassium chemically reacts with and actively wets the metal chalcogenide layer on the surface of the metal substrate.

In another form, the layer of sodium or potassium may be formed on the surface of the metal substrate over the metal chalcogenide layer by at least partially immersing the metal substrate in a nonaqueous liquid electrolyte solution comprising an alkali metal salt dissolved in a polar aprotic organic solvent and establishing an electrical potential between the metal substrate and a counter electrode immersed in the nonaqueous liquid electrolyte solution such that alkali metals ions in the electrolyte solution are reduced and deposited on the surface of the metal substrate over the metal chalcogenide layer to form the layer of sodium or potassium on the surface of the metal substrate over the metal chalcogenide layer.

In yet another form, the layer of sodium or potassium may be formed on the surface of the metal substrate over the metal chalcogenide layer by laminating a sodium or potassium metal foil onto the metal chalcogenide layer on the surface of the metal substrate such that the sodium or potassium metal foil physically and chemically bonds to the metal chalcogenide layer on the surface of the metal substrate.

In one form, the metal substrate may be non-porous and may include a first major surface and an opposite second major surface. In such case, the metal chalcogenide layer and the layer of sodium or potassium may be sequentially formed on the first and second major surface of the metal substrate.

In another form, the metal substrate may be porous and may include a first side, an opposite second side, and a plurality of pores defined by wall surfaces extending between the first and second sides of the metal substrate. In such case, the metal chalcogenide layer and the layer of sodium or potassium may be sequentially formed on the first and second sides of the metal substrate and on the wall surfaces extending between the first and second sides of the metal substrate, without blocking the pores of the metal substrate.

DETAILED DESCRIPTION

The presently disclosed electrochemical cell includes an alkali metal as a negative electrode material and thus exhibits relatively high energy density, as compared to electrochemical cells that are formed with composite negative electrode materials including a porous host material for storage of the alkali metal. During manufacture of the electrochemical cell, a robust physical and chemical bond is formed between the alkali metal and a surface of a negative electrode current collector via formation of an intermediate metal chalcogenide layer. The metal chalcogenide layer helps the alkali metal adhere to the surface the negative electrode current collector and allows for the formation of a superior bond between the alkali metal negative electrode layer and the negative electrode current collector. Formation of the intermediate metal chalcogenide layer also allows for formation of thin uniform alkali metal layers on porous and non-porous negative electrode current collectors having a variety of different configurations. The alkali metal negative electrode of the presently disclosed electrochemical cell may comprise lithium (Li), sodium (Na), or potassium (K).

Figure 1:
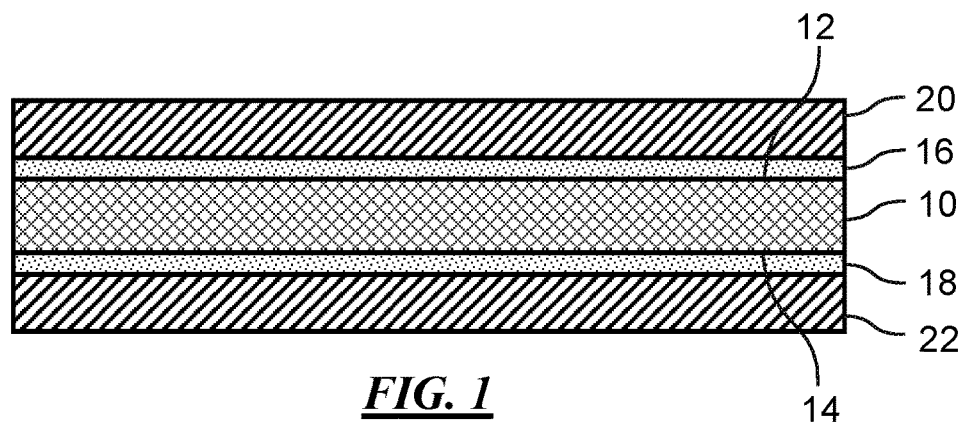
FIG. 1 is a side cross-sectional view of a negative electrode current collector having a first alkali metal negative electrode layer and a first intermediate metal chalcogenide layer formed on a first major surface thereof, and a second alkali metal negative electrode layer and a second metal chalcogenide layer formed on a second major surface thereof.

FIG. 1 illustrates in idealized fashion a side cross-sectional view of a negative electrode current collector 10 for an electrochemical cell (not shown) of a secondary alkali metal battery (not shown). The negative electrode current collector 10 includes a first major surface 12 and an opposite second major surface 14. A thin first metal chalcogenide layer 16 is formed directly on the first major surface 12 of the current collector 10, and a thin second metal chalcogenide layer 18 is formed on the second major surface 14 of the current collector 10. In addition, a first alkali metal negative electrode layer 20 is formed directly on the first metal chalcogenide layer 16 over the first major surface 12 of the current collector 10, and a second alkali metal negative electrode layer 22 is formed directly on the second metal chalcogenide layer 18 over the second major surface 14 of the current collector 10.

In assembly, the negative electrode current collector 10 may be electrically coupled to a positive electrode current collector (not shown) which may be coated on one of both sides with a positive electrode layer. A porous separator layer (not shown) may be sandwiched between one of the first or second alkali metal negative electrode layers 20, 22 of the negative electrode current collector 10 and an opposing positive electrode layer of the positive electrode current collector so that alkali metal ions can flow through the separator layer between the opposing negative and positive electrode layers while electrons simultaneously travel between the negative and positive electrode layers via an external circuit.

The first and second metal chalcogenide layers 16, 18 chemically and physically bond the first and second alkali metal negative electrode layers 20, 22 to the first and second major surfaces 12, 14 of the current collector 10. The metal chalcogenide layers 16, 18 may be "alkaliphilic," meaning that alkali metals (e.g, Li, Na, and/or K) have an affinity for the metal chalcogenide layers 16, 18 and actively wet the chalcogenide layers 16, 18. As such, the metal chalcogenide layers 16, 18 may help the alkali metal negative electrode layers 20, 22 adhere to the first and second major surfaces 12, 14 of the current collector 10 and also may help maintain electrical contact between the negative electrode layers 20, 22 and the negative electrode current collector 10 during operation and/or movement of the electrochemical cell. For example, the metal chalcogenide layers 16, 18 may help prevent delamination or separation of the negative electrode layers 20, 22 from the negative electrode current collector 10 during bending or flexing of the electrochemical cell. In addition, the metal chalcogenide layers 16, 18 may promote wetting of the alkali metal negative electrode layers 20, 22 on the first and second major surfaces 12, 14 of the negative electrode current collector 10 during manufacture of the electrochemical cell and during subsequent charging cycles.

The negative electrode current collector 10 may comprise any material that is capable of collecting and reversibly passing free electrons to and from the negative electrode layers 20, 22. For example, the negative electrode current collector 10 may comprise an electrically conductive metal or metal alloy, e.g., a transition metal or alloy thereof. In some specific examples, the negative electrode current collector 10 may comprise copper (Cu), nickel (Ni), an iron (Fe) alloy (e.g., stainless steel), or titanium (Ti). Other electrically conductive metals may of course be used, if desired.

The negative electrode current collector 10 may be in the form of a thin and flexible porous or non-porous metal substrate. For example, the negative electrode current collector 10 may be in the form of a thin and flexible non-porous metal foil, a porous metal mesh, a perforated metal sheet, or a porous open cell metal foam. The specific configuration of the negative electrode current collector 10 may depend upon the intended application of use. The negative electrode current collector 10 may have a thickness in the range of 8 micrometers to 150 micrometers. For example, in embodiments where the negative electrode current collector 10 is in the form of a non-porous metal foil, a porous metal mesh, or a perforated metal sheet, the current collector 10 may have thicknesses in the range of 8 micrometers to 20 micrometers. As another example, in embodiments where the negative electrode current collector 10 is in the form of porous open-cell metal foams, the current collector 10 may have thicknesses in the range of 50 micrometers to 150 micrometers.

In FIG. 1, the first and second major surfaces 12, 14 of the current collector 10 are depicted as being substantially flat, which may be the case in embodiments where the current collector 10 comprises a metal foil or a perforated metal sheet. However, in other embodiments, for example, where the current collector 10 comprises a metal mesh or an open-cell metal foam, the surfaces 12, 14 of the current collector 10 may be contoured and the layers 16, 18, 20, 22 may substantially conform to the contours thereof. For example, in some embodiments, the current collector 10 may comprise an open-cell metal foam (not shown) having a plurality of open interconnected pores defined by wall surfaces that extend between a first side and an opposite second side of the current collector 10. In such case, a metal chalcogenide layer and an overlying alkali metal negative electrode layer may be formed on the current collector 10 and on the wall surfaces extending between the first and second sides of the current collector 10.

The first and second metal chalcogenide layers 16, 18 each may comprise a transition metal chalcogenide (e.g., an oxide, sulfide, and/or selenide of copper (Cu), nickel (Ni), iron (Fe), and/or titanium (Ti)). For example, one or both of the metal chalcogenide layers 16, 18 may comprise a transition metal chalcogenide represented by one or more of the following formulas: $Me_2Ch$, $MeCh_2$, $MeCh$, or $Me_2Ch_3$, where Me is a transition metal (e.g., Cu, Ni, Fe, and/or Ti) and Ch is a chalcogen (e.g., O, S, and/or Se). The composition of the metal chalcogenide layers 16, 18 may depend on the composition of the negative electrode current collector 10. For example, in embodiments where the negative electrode current collector 10 comprises copper (Cu), the metal chalcogenide layers 16, 18 may comprise copper oxide (e.g., CuO and/or $Cu_2O$), copper sulfide (e.g., CuS and/or $Cu_2S$), and/or copper selenide (e.g., CuSe and/or $Cu_2Se$). Additionally or alternatively, the metal chalcogenide layers 16, 18 may comprise an alkali metal chalcogenide (e.g., an oxide, sulfide, and/or selenide of an alkali metal). For example, the metal chalcogenide layers 16, 18 may comprise an alkali metal chalcogenide having the formula $A_2Ch$, where A is an alkali metal (Li, Na, or K) and Ch is a chalcogen (e.g., O, S, and/or Se). In some embodiments, the metal chalcogenide layers 16, 18 may comprise a composite of one or more transition metal chalcogenides and one or more alkali metal chalcogenides. The chalcogenides included in the metal chalcogenide layers 16, 18 may be stoichiometric or non-stoichiometric. The metal chalcogenide layers 16, 18 may have thicknesses in the range of one nanometer to 10 micrometers.

The alkali metal negative electrode layers 20, 22 may consist essentially of an alkali metal (Li, Na, or K). For example, the alkali metal negative electrode layers 20, 22 may comprise, by weight, greater than 97% Li, Na, or K or, more preferably, greater than 99% Li, Na, or K. However, the negative electrode layers 20, 22 preferably do not comprise any other elements or compounds that undergo a reversible redox reaction with lithium, sodium, or potassium during operation of the electrochemical cell. For example, the negative electrode layers 20, 22 preferably do not comprise an intercalation host material that is formulated to undergo the reversible insertion or intercalation of lithium, sodium, or potassium ions or an alloying material that can electrochemically alloy and form compound phases with lithium, sodium, or potassium. In addition, the negative electrode layers 20, 22 preferably do not comprise a conversion material or an alloy material that can electrochemically alloy and form compound phases with lithium, sodium, or potassium. Some examples of materials that are preferably excluded from the negative electrode layers 20, 22 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, non-alkali metal oxides (e.g., iron oxide, cobalt oxide, manganese oxide, copper oxide, nickel oxide, chromium oxide, ruthenium oxide, and/or molybedenum oxide), metal phosphides, non-alkali metal sulfides, and metal nitrides (e.g., phosphides, sulfides, and/or nitrides or iron, manganese, nickel, copper, and/or cobalt). In addition, the negative electrode layer 12 preferably does not comprise a polymeric binder. Some examples of polymeric binders that are preferably excluded from the negative electrode layer 12 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The alkali metal negative electrode layers 20, 22 may have thicknesses in the range of one micrometer to 1000 micrometers.

Figure 2:
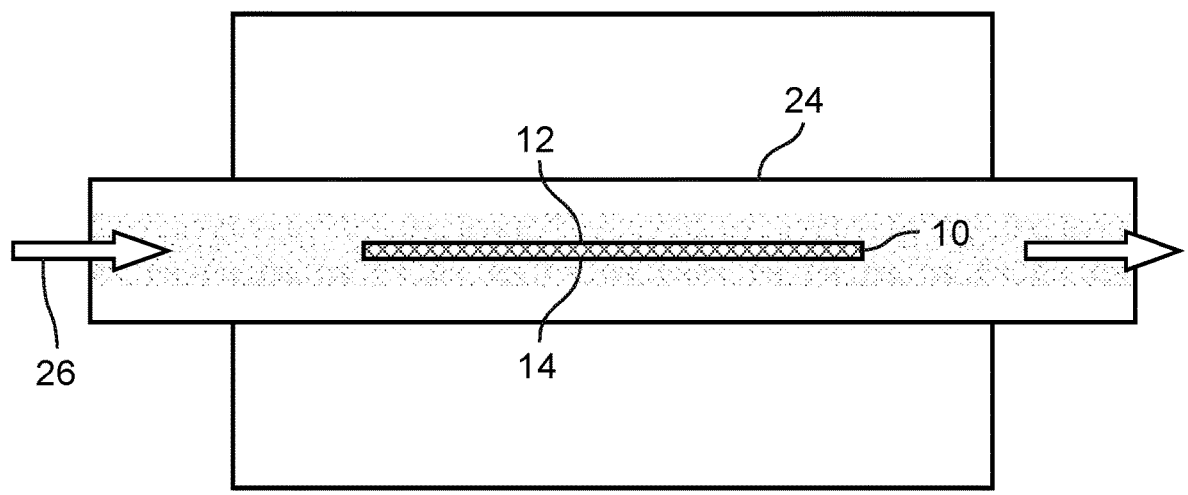
FIG. 2 is a cross-sectional view of an embodiment of an apparatus for forming a metal oxide layer on a surface of a negative electrode current collector by exposing the surface of the negative electrode current collector to a stream of air.
Figure 3:
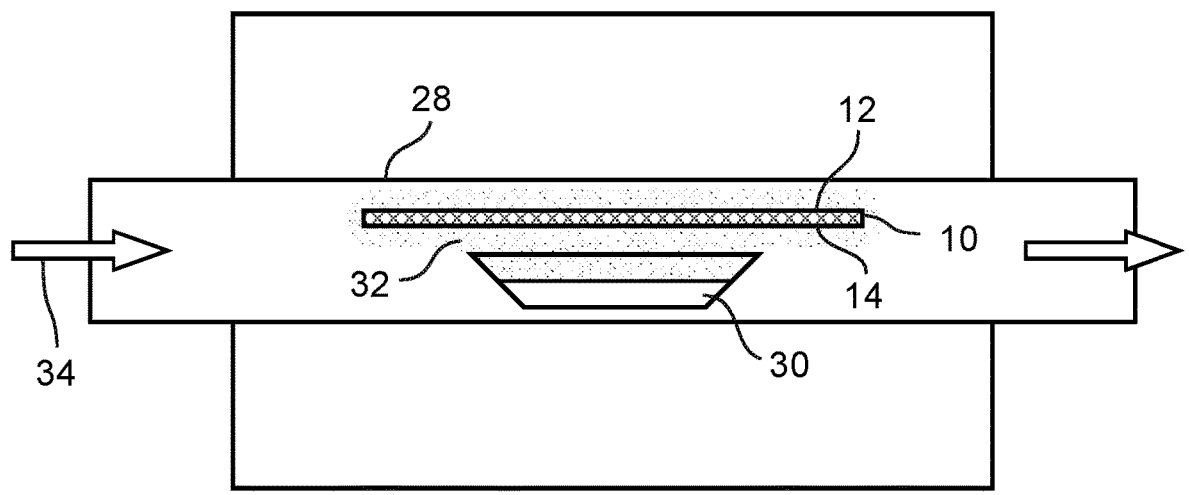
FIG. 3 is a cross-sectional view of an embodiment of another apparatus for forming a metal sulfide layer or a metal selenide layer on a surface of a negative electrode current collector by exposing the surface of the negative electrode current collector a gaseous sulfur or selenium.
Figure 4:
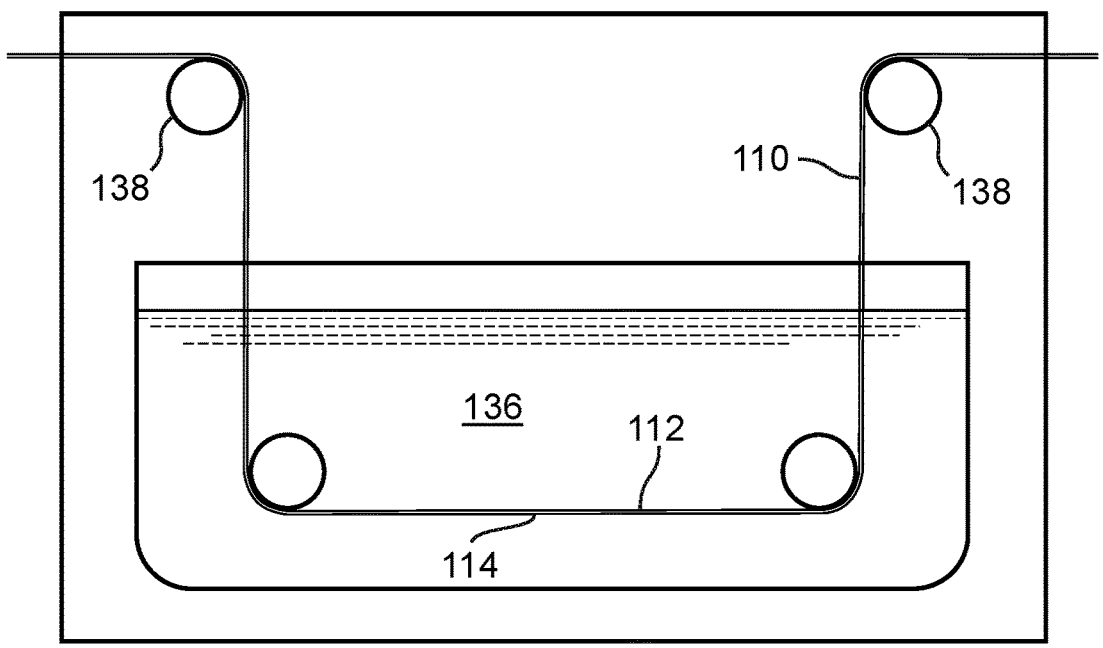
FIG. 4 is a cross-sectional view of an embodiment of an apparatus for forming a metal chalcogenide layer on a surface of a negative electrode current collector using a chemical solution deposition process.

Referring now to FIGS. 2, 3, and 4, the first and second metal chalcogenide layers 16, 18 may be coated, deposited or otherwise formed on the first and second major surfaces 12, 14 of the negative electrode current collector 10 by exposing the surfaces 12, 14 to a chalcogen or a chalcogen-donor compound.

Exposing the surfaces 12, 14 of the current collector 10 to a chalcogen or a chalcogen-donor compound allows the chalcogen to chemically react with the surfaces 12, 14 of the current collector 10 and effectively form the first and second metal chalcogenide layers 16, 18 on the surfaces 12, 14 such that the layers 16, 18 uniformly and effectively conform to the contours of the surfaces 12, 14, regardless of their configuration. In addition, in embodiments where the current collector 10 is porous, exposing the current collector 10 to a chalcogen or a chalcogen-donor compound allows the chalcogen to chemically react with the major surfaces 12, 14 of the current collector 10 (as well as any wall surfaces extending between the surfaces 12, 14) and effectively and uniformly form the first and second metal chalcogenide layers 16, 18 thereon, without physically clogging or blocking the pores of the current collector 10. The surfaces 12, 14 of the negative electrode current collector 10 suitably may be exposed to a chalcogen or a chalcogen-donor compound for a sufficient duration for the metal on the surfaces 12, 14 of the current collector 10 to chemically react with the chalcogen and respectively form the first and second metal chalcogenide layers 16, 18 on the surfaces 12, 14 of the current collector 10. The thicknesses of the first and second metal chalcogenide layers 16, 18 may be controlled or adjusted by controlling the duration of chalcogen exposure. The duration of chalcogen exposure may depend upon the composition of the current collector 10 (e.g., copper, nickel, iron-based, and/or titanium), the temperature at which the current collector 10 is exposed to the chalcogen or the chalcogen-donor compound, and the rate at which the current collector 10 reacts with the chalcogen to form a chalcogenide.

As shown in FIG. 2, in one form, the chalcogen may comprise oxygen (02) and the first and second major surfaces 12, 14 of the negative electrode current collector 10 may be exposed to gaseous oxygen by placing the current collector 10 in an enclosed chamber 24 and directing a stream of air 26 (about 20-22 vol. % 02) over and around the first and second major surfaces 12, 14 of the current collector 10. The stream of air 26 and the current collector 10 may be heated in the chamber 24 at a sufficient temperature and for a sufficient duration to form a first metal oxide layer on the first major surface 12 of the current collector 10 and a second metal oxide layer on the second major surface 14 of the current collector 10. In particular, the stream of air 26 and the current collector 10 may be heated in the chamber 24 at a sufficient temperature to promote oxidation of the first and second major surfaces 12, 14 of the current collector 10, without melting or negatively impacting the structural integrity of the current collector 10. For example, the stream of air 26 may be heated to a temperature greater than 200° C. and the current collector 10 may be heated within the chamber 24 to a temperature in the range of 200° C. to 1050° C. and exposed to the stream of air 26 for a duration in the range of 0.1 seconds to 10 minutes to form the first metal oxide layer on the first major surface 12 of the current collector 10 and the second metal oxide layer on the second major surface 14 of the current collector 10. In one form, the current collector 10 may be heated within the chamber 24 at a temperature of about 900° C. while being exposed to the stream of air 26 for a duration of about 10 seconds. The duration of oxygen exposure may depend upon the composition of the current collector 10, the temperature at which the current collector 10 is exposed to the stream of air 26, and the rate at which the current collector 10 reacts with oxygen to form an oxide.

As shown in FIG. 3, in another embodiment, the chalcogen may comprise sulfur (S) and/or selenium (Se), and the first and second major surfaces 12, 14 of the negative electrode current collector 10 may be exposed to gaseous sulfur and/or selenium by placing the current collector 10 in an enclosed chamber 28 along with a volume of solid phase sulfur and/or selenium 30. The solid phase sulfur and/or selenium 30 may be provided in elemental and/or compound form. The solid phase sulfur and/or selenium 30 may be heated in the chamber 28 at a temperature in the range of 100° C. to 550° C. to release gaseous sulfur and/or selenium 32 into the chamber 28 around the current collector 10. The current collector 10 may be heated in the chamber 28 at a sufficient temperature and for a sufficient duration to form a first metal sulfide and/or selenide layer on the first major surface 12 of the current collector 10 and a second metal sulfide and/or selenide layer on the second major surface 14 of the current collector 10. In particular, the current collector 10 may be heated in the chamber 28 at a temperature and for a duration that allows a chemical reaction to occur between the gaseous sulfur and/or selenium and the first and second major surfaces 12, 14 of the current collector 10, without melting or negatively impacting the structural integrity of the current collector 10. For example, the current collector 10 may be heated in the chamber 28 at a temperature in the range of 100° C. to 550° C. and may be maintained therein for a duration in the range of 0.1 seconds to 10 minutes to form the first metal sulfide and/or selenide layer on the first major surface 12 of the current collector 10 and the second metal sulfide and/or selenide layer on the second major surface 14 of the current collector 10.

A stream of an inert gas (e.g., argon) 34 may be directed through the chamber 28 while the current collector 10 and the solid phase sulfur and/or selenium 30 are heated in the chamber 28 to promote physical contact between the gaseous sulfur and/or selenium 32 and the surfaces 12, 14 of the negative electrode current collector 10. In some embodiments, a subatmospheric pressure environment may be created within the chamber 28 to promote the release of gaseous sulfur and/or selenium 32 from the volume of solid phase sulfur and/or selenium 30. In other embodiments, the solid phase sulfur and/or selenium 30 may be heated in a separate chamber (not shown) to produce a stream of gaseous sulfur and/or selenium that is supplied to the chamber 28 to promote physical contact between the gaseous sulfur and/or selenium 32 and the surfaces 12, 14 of the negative electrode current collector 10.

In one embodiment, the chalcogen may comprise oxygen (O), sulfur (S) and/or selenium (Se), and the first and second metal chalcogenide layers 16, 18 may be formed on the first and second major surfaces 12, 14 of the current collector 10 using a chemical solution deposition process. In such case, a chalcogenide precursor solution may be applied to the surfaces 12, 14 of the current collector 10 by any suitable means, for example, by immersion, spray, or coating. The chalcogenide precursor solution may be aqueous or non-aqueous and may comprise an organic or inorganic chalcogen donor compound dissolved in a solvent. The chalcogen donor compound (or chalcogen atom transfer agent) may comprise any compound that can react with the metal of the current collector 10 by donating or transferring a single chalcogen atom (e.g., O, S, and/or Se), or by donating or transferring multiple chalcogen atoms one at a time to the metal of the current collector 10, thereby forming the first and second metal chalcogenide layers 16, 18 on the first and second major surfaces 12, 14 of the current collector 10. In embodiments where the first and second metal chalcogenide layers 16, 18 comprise metal oxide layers, the chalcogen donor compound may comprise an oxygen donor compound or an oxygen-atom transfer agent. In embodiments where the first and second metal chalcogenide layers 16, 18 comprise metal sulfide layers, the chalcogen donor compound may comprise a sulfur donor compound or a sulfur-atom transfer agent. In embodiments where the first and second metal chalcogenide layers 16, 18 comprise metal selenide layers, the chalcogen donor compound may comprise a selenium donor compound or a selenium-atom transfer agent.

In one form, the first and second metal chalcogenide layers 16, 18 may be formed on the surfaces 12, 14 of the negative electrode current collector 10 via a continuous process. As shown in FIG. 4, in a first stage of the process, an electrically conductive metal substrate 110 having a first major surface 112 and an opposite second major surface 114 may be provided. The metal substrate 110 may comprise a continuous metal foil, a metal mesh, or a perforated metal sheet. A chalcogenide precursor solution 136 may be applied to the surfaces 112, 114 of the metal substrate 110 by immersing the substrate 110 in a volume of the chalcogenide precursor solution 136. In one form, the metal substrate 110 may be stretched over a plurality of rollers 138, which may direct the substrate 110 through the chalcogenide precursor solution 136.

After formation of the first and second metal chalcogenide layers 16, 18, the first and second alkali metal negative electrode layers 20, 22 may be respectively formed on the first and second metal chalcogenide layers 16, 18 over the first and second major surfaces 12, 14 of the current collector 10. The first and second alkali metal negative electrode layers 20, 22 may be respectively formed on the first and second metal chalcogenide layers 16, 18 by placing the first and second metal chalcogenide layers 16, 18 in contact with a source of gaseous or molten alkali metal, or by plating the layers 20, 22 onto the metal chalcogenide layers 16, 18 using an electrochemical deposition process. The first and second metal chalcogenide layers 16, 18 allow the alkali metal to actively and uniformly wet the metal chalcogenide layers 16, 18 and thereby spread over the surfaces 12, 14 of the current collector 10. In addition, in embodiments where the surfaces 12, 14 of the current collector 10 are contoured and/or where the current collector 10 is porous, the metal chalcogenide layers 16, 18 allow the alkali metal to spread over the surfaces 12, 14 and to be drawn into and conform to the pores of the current collector 10, without physically clogging or blocking the pores of the current collector 10. In this way, the first and second alkali metal negative electrode layers 12, 14 may be formed on the current collector 10 without eliminating or substantially reducing the surface contours and/or the surface area of the current collector 10. The thicknesses of the first and second alkali metal negative electrode layers 20, 22 may be controlled or adjusted by controlling the duration of exposure to the alkali metal. In addition, the duration of alkali metal exposure may depend upon the composition of the current collector 10 (e.g., copper, nickel, iron-based, and/or titanium), the temperature at which the metal chalcogenide layers 16, 18 are exposed to the alkali metal, and the rate at which the metal chalcogenide layers 16, 18 react with the alkali metal to form a compound thereof.

Figure 5:
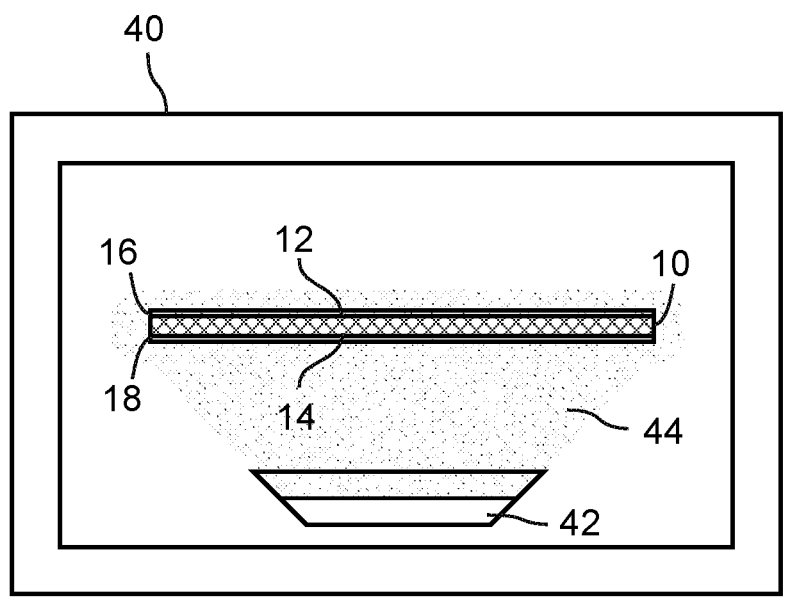
FIG. 5 is a cross-sectional view of an embodiment of an apparatus for forming an alkali metal layer over a metal chalcogenide layer on a surface of a negative electrode current collector by placing the metal chalcogenide layer in contact with gaseous lithium, sodium, or potassium.

As shown in FIG. 5, in one form, the first and second alkali metal negative electrode layers 20, 22 may be formed on the first and second metal chalcogenide layers 16, 18 by exposing the layers 16, 18 to a source of gaseous alkali metal. For example, the first and second metal chalcogenide layers 16, 18 may be placed in contact with a source of gaseous alkali metal by placing the current collector 10 in an enclosed chamber 40 along with a volume of solid or liquid phase alkali metal 42. The alkali metal 42 may be heated in the chamber 40 to release a volume of gaseous alkali metal 44 into the chamber 158 around the current collector 120 For example, the alkali metal 42 may be heated in the chamber 40 at a temperature in the range of 180° C. to 1000° C. to release a volume of gaseous alkali metal 44 into the chamber 40 around the current collector 10. The current collector 10 may be heated in the chamber 40 at a temperature and for a duration which allows the gaseous alkali metal 44 to chemically react with and bond to the first and second metal chalcogenide layers 16, 18 and form a first alkali metal negative electrode layer on the first metal chalcogenide layer 16 and a second alkali metal negative electrode layer on the second metal chalcogenide layer 18 on the respective first and second major surfaces 12, 14 of the current collector 10. For example, the current collector 10 may be heated in the chamber 40 at a temperature in the range of 180° C. to 1000° C. and may be maintained in the chamber 40 for a duration in the range of 1 second to 5 hours to form the first and second alkali metal negative electrode layers. In some embodiments, a subatmospheric pressure environment may be created within the chamber 40 to promote the release of gaseous alkali metal 44 from the volume of solid or liquid phase alkali metal 42.

Figure 6:
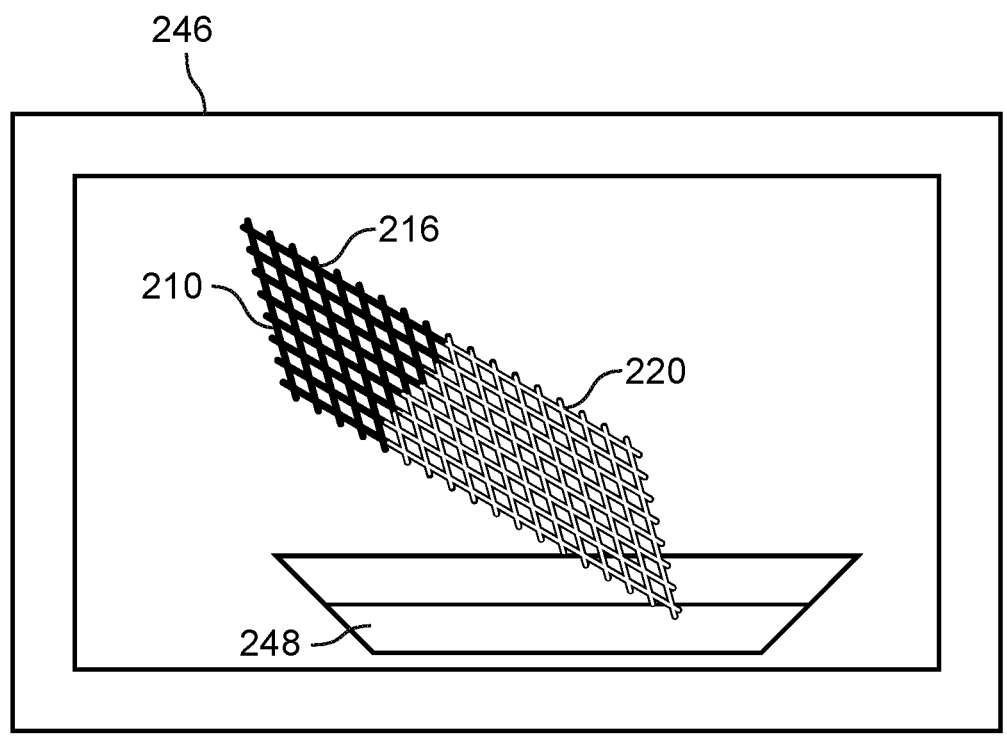
FIG. 6 is cross-sectional view of an embodiment of another apparatus for forming an alkali metal layer over a metal chalcogenide layer on a surface of a negative electrode current collector by placing a portion of the metal chalcogenide layer in contact with a volume of molten lithium.

As shown in FIG. 6, in another embodiment, a negative electrode current collector 210 in the form of an electrically conductive metal mesh having an exterior surface that has been coated with a thin metal chalcogenide layer 216 may be placed in contact with molten alkali metal by introducing the current collector 210 into a chamber 246 containing a volume of molten alkali metal 248. The metal chalcogenide layer 216 may have been previously formed on the exterior surface of the current collector 210 by any suitable method, for example, by exposing the exterior surface to a chalcogen or a chalcogen-donor compound, as described above. The molten alkali metal 248 may be heated in the chamber 246 at a temperature in the range of 225° C. to 450° C. and the current collector 210 (including the metal chalcogenide layer 216) may be heated in the chamber 246 at a temperature in the range of 25° C. to 450° C. The specific temperature at which the molten alkali metal 248, the current collector 210, and the metal chalcogenide layer 216 are heated may depend upon the composition of the current collector 210 and the metal chalcogenide layer 216. Then, a portion of the current collector 210 (having the metal chalcogenide layer 216 formed thereon) may be placed in physical contact with the molten alkali metal 248, for example, by immersing the portion of the current collector 210 in the molten alkali metal 248. The current collector 210 may be maintained in physical contact with the molten alkali metal 248 for a sufficient duration to allow the molten alkali metal 248 to chemically react with and bond to the metal chalcogenide layer 216 on the exterior surface of the current collector 210. In addition, the current collector 210 may be maintained in physical contact with the molten alkali metal 248 for a duration that allows the molten alkali metal 248 to spread over the entire exterior surface of the metal chalcogenide layer 216 (on the current collector 210) and form a uniform alkali metal layer 220 thereon. For example, the current collector 210 may be maintained in physical contact with the molten alkali metal 248 for a duration in the range of 1 second to 1 hour to form a uniform alkali metal layer 220 over an entire exterior surface of the current collector 210.

When the current collector 210 is placed in physical contact with the molten alkali metal 248, the metal chalcogenide layer 216 on the exterior surface of the current collector 210 allows the molten alkali metal 248 to quickly and uniformly wet the metal chalcogenide layer 216 and thereby spread over the entire exterior surface the current collector 210. In addition, formation of the metal chalcogenide layer 216 on the exterior surface of the current collector 210 allows the molten alkali metal 248 to spread over the entire exterior surface of the current collector 210, without having to fully immerse the current collector 210 in the molten alkali metal 248. In other words, when a metal chalcogenide layer 216 is formed on an exterior (and/or interior) surface of a current collector 210, not all surfaces of the metal chalcogenide layer 216 need to be exposed to an alkali metal in order for the alkali metal to be effectively distributed over the entire surface of the metal chalcogenide layer 216 on the current collector 210. As such, formation of the metal chalcogenide layer 216 on the exterior surface of the current collector 210 allows the alkali metal layer 220 to be effectively and uniformly formed over the exterior surface of the current collector 210, without physically clogging or blocking the openings, perforations, or pores in the current collector 210.

Figure 7:
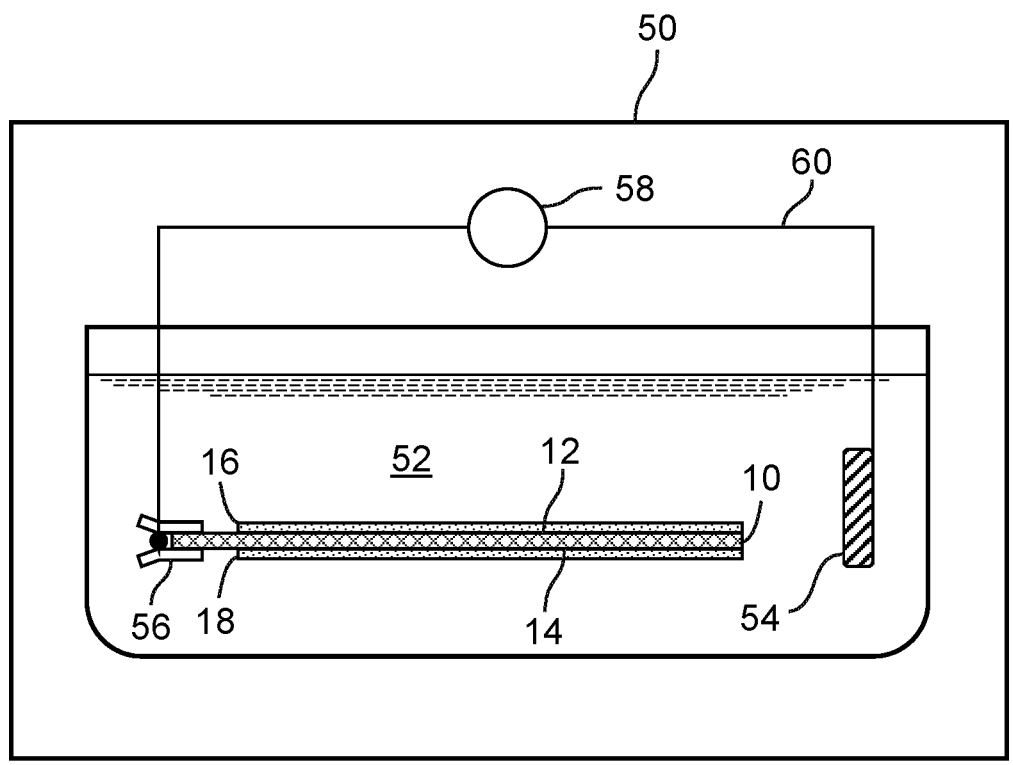
FIG. 7 is a cross-sectional view of an embodiment of an apparatus for forming an alkali metal layer over a metal chalcogenide layer on a surface of a negative electrode current collector using an electrochemical deposition process.

As shown in FIG. 7, in one form, after formation of the first and second metal chalcogenide layers 16, 18 on the first and second major surfaces 12, 14 of the negative electrode current collector 10, the first and second alkali metal negative electrode layers 20, 22 may be respectively formed on the first and second metal chalcogenide layers 16, 18 over the first and second major surfaces 12, 14 of the current collector 10 using an electrochemical deposition process (also referred to as electroplating). In such case, the current collector 10 (including the first and second metal chalcogenide layers 16, 18) may be placed in an enclosed chamber 50 and at least partially immersed in a nonaqueous liquid electrolyte solution 52 along with a counter electrode 54. In one form, the current collector 10 may be held within the electrolyte solution 52 by a clamp 56.

The alkali metal salt may comprise $XClO_4$, $XAlCl_4$, $XI$, $XBr$, $XSCN$, $XBF_4$, $XB(C_6H_5)_4$, $XAsF_6$, $XCF_3SO_3$, $XN(CF_3SO_2)_2$, $XPF_6$, $XNO_3$, $X_2SO_4$, $XCl$, and combinations thereof, wherein X=Li, Na, and/or K. The organic solvent may comprise a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane, tetraethylene glycol dimethyl ether, poly(ethylene glycol) dimethyl ether), a cyclic ether (i.e., tetrahydrofuran, 2-methyltetrahydrofuran), or a combination thereof. The nonaqueous liquid electrolyte solution 52 may have an alkali metal salt concentration in the range of 0.1 M to 3 M.

The counter electrode 54 is sacrificial and may comprise any alkali metal-containing material that can electrochemically release alkali metal ions when an electrical potential is established between the current collector 10 and the counter electrode 54. For example, in one form, the counter electrode 54 may comprise an alkali metal in an amount, by weight, greater than 97% or, more preferably, greater than 99%. In other embodiments, the counter electrode 54 may be a host material with intercalated alkali metal ions or an alkali metal alloy. Examples of host materials that can be intercalated or alloyed with alkali metals include: carbon-based materials (e.g., graphite, activated carbon, carbon black, and graphene), silicon, silicon-based alloys, tin oxide, aluminum, indium, zinc, germanium, silicon oxide, titanium oxide, lithium titanate, transition metal oxides represented by the formula LiMeO2, LiMePO4, and/or LiMe2O4, where Me is a transition metal, and combinations thereof.

The current collector 10 and the counter electrode 54 are electrically coupled to each other and to a power supply 58 via an external circuit 60. To begin the electrochemical deposition process, an electrical potential is established between the current collector 10 and the counter electrode 54, for example, by applying an electric current from the power supply 58 to the counter electrode 54. Establishing an electrical potential between the current collector 10 and the counter electrode 54 initiates chemical oxidation and reduction reactions at the current collector 10 and the counter electrode 54. As a result, alkali metal ions dissolved in the electrolyte solution 52 are reduced at the interface between the electrolyte solution 52 and the current collector 10 such that alkali metal is deposited onto the first and second metal chalcogenide layers 16, 18 over the first and second major surfaces 12, 14 of the current collector 10. In addition, when an electrical potential is established between the current collector 10 and the counter electrode 54, alkali metal from the counter electrode 54 is oxidized and dissolves in the electrolyte solution 52, with the rate at which alkali metal ions from the counter electrode 54 dissolve in the electrolyte solution 52 being equal to the rate at which alkali metal ions are deposited on the first and second metal chalcogenide layers 16, 18.

Figure 8:
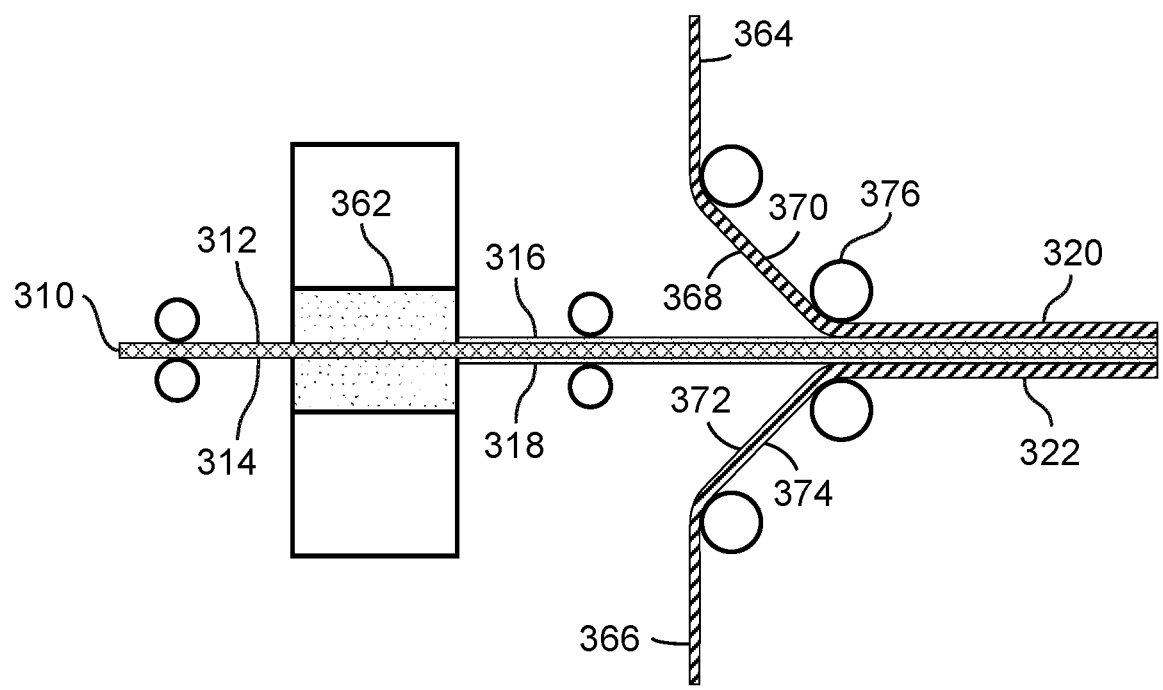
FIG. 8 is a cross-sectional view of an embodiment of an apparatus for forming a metal chalcogenide layer on a surface of a metal substrate and then laminating an alkali metal foil onto the metal chalcogenide layer on the surface of the metal substrate.

In some embodiments, the negative electrode current collector 10, including the first and second metal chalcogenide layers 16, 18 and the overlying first and second alkali metal negative electrode layers 20, 22, may be formed via a continuous process. As shown in FIG. 8, in a first stage of the process, an electrically conductive metal substrate 310 having a first major surface 312 and an opposite second major surface 314 may be provided. The metal substrate 310 may comprise a continuous metal foil, a metal mesh, or a perforated metal sheet. The surfaces 312, 314 of the metal substrate 310 may be exposed to a chalcogen or a chalcogen-donor compound by passing the metal substrate 310 through a chamber 362 that comprises a gaseous chalcogen or a chalcogen-donor compound dissolved in a solvent. As described in further detail with respect to FIGS. 2, 3, and 4, the metal substrate 310 may be exposed to a gaseous chalcogen or a chalcogen-donor compound within the chamber 362 for a duration that allows for the formation of a first metal chalcogenide layer 316 on the first major surface 312 of the metal substrate 310 and a second metal chalcogenide layer 318 on the second major surface 314 of the metal substrate 310. The first and second metal chalcogenide layers 316, 318 may comprise metal oxide, sulfide, and/or selenide layers.

After formation of the first and second metal chalcogenide layers 316, 318 on the first and second major surfaces 312, 314 of the metal substrate 310, a first alkali metal foil 364 and/or a second alkali metal foil 366 may be provided. The first and second alkali metal foils 364, 366 may have thicknesses in the range of 5-100 µm. The first alkali metal foil 364 may be laminated onto the first metal chalcogenide layer 316 on the first major surface 312 of the metal substrate 310 to form a first alkali metal layer 320, and the second alkali metal foil 366 may be laminated onto the second metal chalcogenide layer 318 on the second major surface 314 of the metal substrate 310 to form a second alkali metal layer 322. The first alkali metal foil 364 may have a first side 368 and an opposite second side 370 and the second alkali metal foil 366 may have a first side 372 and an opposite second side 374. Prior to lamination, the first alkali metal foil 372 may be positioned adjacent the metal substrate 320 such that the first side 368 of the first alkali metal foil 364 confronts and faces toward the first major surface 312 of the metal substrate 310 and the first side 372 of the second alkali metal foil 366 confronts and faces toward the second major surface 314 of the metal substrate 310. Thereafter, the first and/or second alkali metal foils 364, 366 may be respectively laminated onto the first and second metal chalcogenide layers 316, 318 on the first and second major surfaces 312, 314 of the metal substrate 310 by passing the metal substrate 310 and the first and/or second alkali metal foils 364, 366 between a pair of metal rollers 376.

Bonding of the first and/or second alkali metal foils 364, 366 to the first and second metal chalcogenide layers 316, 318 may be facilitated by heating and/or maintaining the first and second metal chalcogenide layers 316, 318 at a temperature above a melting point of the alkali metal prior to and/or during the lamination process. For example, the metal substrate 310 and the first and second metal chalcogenide layers 316, 318 may be heated to a temperature above the melting point of the alkali metal prior to and/or during the lamination process such that the first sides 368, 372 of the first and second alkali metal foils 364, 366 locally melt and actively wet the first and second metal chalcogenide layers 316, 318 on the metal substrate 310 during the lamination process, without melting the second sides 370, 372 of the first and second alkali metal foils 364, 366. Selectively and locally melting the first sides 368, 372 of the first and second alkali metal foils 364, 366 helps ensure formation of a strong chemical and physical bond between the metal foils 364, 366 and the metal chalcogenide layers 316, 318 on the metal substrate 310. The temperature of the metal substrate 310 and the first and second metal chalcogenide layers 316, 318 may be controlled during the lamination process to avoid melting of the second sides 370, 372 of the first and second alkali metal foils 364, 366 so that the structural integrity of the foils 364, 366 is maintained during the lamination process. For example, the metal substrate 310 and the first and second metal chalcogenide layers 316, 318 may be heated at a temperature in the range of 250° C. to 450° C. immediately prior to and/or during the lamination process. The specific temperature at which the metal substrate 310 and the first and second metal chalcogenide layers 316, 318 are heated may depend upon the composition of the metal substrate 310 and the first and second metal chalcogenide layers 316, 318. The second sides 370, 372 of the first and second alkali metal foils 364, 366 may be maintained at a temperature below the melting point of the alkali metal during the lamination process.

After formation of the first and second alkali metal layers 320, 322, the metal substrate 310 may be formed into the desired size and shape of one or more negative electrode current collectors (not shown) and used in the manufacture of one or more electrochemical cells of a secondary lithium, sodium, or potassium ion battery. In such case, the first and second alkali metal layers 320, 322 may comprise first and second alkali metal negative electrode layers.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. An electrochemical cell comprising:
a positive electrode layer electrically coupled to a positive electrode current collector;
an alkali metal negative electrode layer spaced apart from the positive electrode layer and electrically coupled to a negative electrode current collector; and
an electrolyte in ionic contact with the positive and negative electrode layers,
wherein the alkali metal negative electrode layer comprises a layer of sodium (Na) or potassium (K),
wherein the alkali metal negative electrode layer is physically and chemically bonded to a surface of the negative electrode current collector via an intermediate metal chalcogenide layer, and
wherein the intermediate metal chalcogenide layer extends continuously between the surface of the negative electrode current collector and the alkali metal negative electrode layer.

2. The electrochemical cell of claim 1 wherein the metal chalcogenide layer comprises a metal oxide, a metal sulfide, a metal selenide, or a combination thereof.

3. The electrochemical cell of claim 1 wherein the negative electrode current collector comprises copper (Cu), and wherein the intermediate metal chalcogenide layer comprises copper oxide, copper sulfide, copper selenide, or a combination thereof.

4. The electrochemical cell of claim 1 wherein the negative electrode current collector comprises a non-porous metal foil, a perforated metal sheet, a porous metal mesh, or a porous open-cell metal foam.

5. The electrochemical cell of claim 1 wherein the negative electrode current collector comprises a first surface and an opposite second surface, and wherein the first surface of the negative electrode current collector is physically and chemically bonded to a first alkali metal negative electrode layer via a first intermediate metal chalcogenide layer, and wherein the second surface of the negative electrode current collector is physically and chemically bonded to a second alkali metal negative electrode layer via a second intermediate metal chalcogenide layer.

6. The electrochemical cell of claim 1 wherein the negative electrode current collector has a thickness in the range of 8-150 µm, the metal chalcogenide layer has a thickness in the range of one nanometer to 10 micrometers, and the alkali metal negative electrode layer has a thickness in the range of one micrometer to 1000 micrometers.

7. The electrochemical cell of claim 1 wherein the alkali metal negative electrode layer comprises, by weight, greater than 97% sodium (Na) or greater than 97% potassium (K).

8. A secondary lithium metal battery including a plurality of electrochemical cells as set forth in claim 1, wherein the electrochemical cells are connected in a series or parallel arrangement.

9. A method of manufacturing an electrochemical cell, the method comprising:
providing a porous or non-porous metal substrate;
exposing a surface of the metal substrate to a chalcogen or a chalcogen donor compound such that a conformal metal chalcogenide layer forms directly on the surface of the metal substrate; and
contacting at least a portion of the conformal metal chalcogenide layer on the surface of the metal substrate with a source of sodium (Na) or potassium (K) to form a layer of sodium or potassium on the surface of the metal substrate over the conformal metal chalcogenide layer
wherein the layer of sodium or potassium is physically and chemically bonded to the surface of the metal substrate via the conformal metal chalcogenide layer, and
wherein the conformal metal chalcogenide layer extends continuously between the surface of the metal substrate and the layer of sodium or potassium.

10. The method of claim 9 wherein the chalcogen comprises oxygen, sulfur, selenium, or a combination thereof, and wherein the metal chalcogenide layer comprises a metal oxide, a metal sulfide, a metal selenide, or a combination thereof.

11. The method of claim 9 wherein the metal substrate comprises copper, and wherein the metal chalcogenide layer comprises copper oxide, copper sulfide, copper selenide, or a combination thereof.

12. The method of claim 9 wherein the chalcogen comprises oxygen, and wherein the conformal metal chalcogenide layer is formed on the surface of the metal substrate by exposing the metal substrate to gaseous oxygen by heating the metal substrate in air such that the gaseous oxygen chemically reacts with and bonds to the surface of the metal substrate.

13. The method of claim 9 wherein the chalcogen comprises sulfur or selenium, and wherein the conformal metal chalcogenide layer is formed on the surface of the metal substrate by exposing the metal substrate to gaseous sulfur or selenium by heating a volume of solid phase sulfur or selenium to release a volume of gaseous sulfur or selenium therefrom and exposing the surface of the metal substrate to the volume of gaseous sulfur or selenium such that the gaseous sulfur or selenium chemically reacts with and bonds to the surface of the metal substrate.

14. The method of claim 9 wherein the conformal metal chalcogenide layer is formed on the surface of the metal substrate by applying a chalcogenide precursor solution to the surface of the metal substrate, wherein the chalcogenide precursor solution comprises a chalcogen-donor compound dissolved in a solvent, and wherein the chalcogen-donor compound comprises at least one of an oxygen donor compound, a sulfur donor compound, or a selenium donor compound.

15. The method of claim 9 wherein the layer of sodium or potassium is formed directly on the metal chalcogenide layer over the surface of the metal substrate by immersing at least a portion of the metal substrate in a volume of molten sodium or potassium such that the molten sodium or potassium chemically reacts with and actively wets the metal chalcogenide layer on the surface of the metal substrate.

16. The method of claim 9 wherein the layer of sodium or potassium is formed directly on the metal chalcogenide layer over the surface of the metal substrate by:
(i) heating a volume of molten sodium or potassium in a subatmospheric pressure environment to release a volume of gaseous sodium or potassium therefrom and exposing the metal chalcogenide layer on the surface of the metal substrate to the volume of gaseous sodium or potassium such that the gaseous sodium or potassium chemically reacts with and actively wets the metal chalcogenide layer on the surface of the metal substrate;
(ii) at least partially immersing the metal substrate in a nonaqueous liquid electrolyte solution comprising an alkali metal salt dissolved in a polar aprotic organic solvent and establishing an electrical potential between the metal substrate and a counter electrode immersed in the nonaqueous liquid electrolyte solution such that alkali metals ions in the electrolyte solution are reduced and deposited on the surface of the metal substrate over the metal chalcogenide layer to form the layer of sodium or potassium on the surface of the metal substrate over the metal chalcogenide layer; or
(iii) laminating a sodium or potassium metal foil onto the metal chalcogenide layer on the surface of the metal substrate such that the sodium or potassium metal foil physically and chemically bonds to the metal chalcogenide layer on the surface of the metal substrate.

17. The method of claim 9 wherein the metal substrate is non-porous and includes a first major surface and an opposite second major surface, and wherein the metal chalcogenide layer and the layer of sodium or potassium are sequentially formed on the first and second major surface of the metal substrate.

18. The method of claim 9 wherein the metal substrate is porous and includes a first side, an opposite second side, and a plurality of pores defined by wall surfaces extending between the first and second sides of the metal substrate, and wherein the metal chalcogenide layer and the layer of sodium or potassium are sequentially formed on the first and second sides of the metal substrate and on the wall surfaces extending between the first and second sides of the metal substrate, without blocking the pores of the metal substrate.

19. The electrochemical cell of claim 1 wherein the alkali metal negative electrode layer is formed directly on the intermediate metal chalcogenide layer and is physically and chemically bonded to the intermediate metal chalcogenide layer.

20. The method of claim 9 wherein the layer of sodium or potassium is formed directly on the conformal metal chalcogenide layer and is physically and chemically bonded to the conformal metal chalcogenide layer.

* * * * *